(12) United States Patent
Belvisi

(10) Patent No.: US 11,263,875 B2
(45) Date of Patent: Mar. 1, 2022

(54) METHOD FOR DETECTING THE PRESENCE OF A SMART CARD CLONING DEVICE IN AN AUTOMATIC PAYMENT AND/OR WITHDRAWAL TERMINAL AND RESPECTIVE AUTOMATIC PAYMENT AND/OR WITHDRAWAL TERMINAL

(71) Applicant: MADIC ITALIA S.P.A., Cardano al Campo (IT)

(72) Inventor: Alberto Belvisi, Fagnano Olona (IT)

(73) Assignee: MADIC ITALIA S.P.A., Cardano al Campo (IT)

( * ) Notice: Subject to any disclaimer, the term of this patent is extended or adjusted under 35 U.S.C. 154(b) by 0 days.

(21) Appl. No.: 16/971,871

(22) PCT Filed: Feb. 23, 2018

(86) PCT No.: PCT/IT2018/000025
§ 371 (c)(1),
(2) Date: Aug. 21, 2020

(87) PCT Pub. No.: WO2019/162975
PCT Pub. Date: Aug. 29, 2019

(65) Prior Publication Data
US 2020/0394878 A1 Dec. 17, 2020

(51) Int. Cl.
*G07F 19/00* (2006.01)
*G06K 7/10* (2006.01)
*G06Q 20/34* (2012.01)

(52) U.S. Cl.
CPC ..... *G07F 19/2055* (2013.01); *G06K 7/10267* (2013.01); *G06Q 20/341* (2013.01)

(58) Field of Classification Search
CPC ............ G07F 19/2055; G06K 7/10267; G06Q 20/341
See application file for complete search history.

(56) References Cited

U.S. PATENT DOCUMENTS

| | | | |
|---|---|---|---|
| 6,164,550 A | 12/2000 | Pitsch | |
| 2007/0057070 A1* | 3/2007 | Scarafile | G07F 19/20 235/475 |
| 2011/0006112 A1 | 1/2011 | Mueller | |
| 2013/0106576 A1* | 5/2013 | Hinman | H04K 3/822 340/10.1 |
| 2015/0213427 A1 | 7/2015 | Hodges et al. | |

FOREIGN PATENT DOCUMENTS

| | | |
|---|---|---|
| EP | 1588314 | 10/2005 |
| ES | 2588996 | * 11/2016 |

* cited by examiner

*Primary Examiner* — Laura A Gudorf
(74) *Attorney, Agent, or Firm* — Workman Nydegger

(57) ABSTRACT

It is described a method for detecting the presence of a device for cloning a smart card in an automatic payment and/or withdrawal terminal, comprising the steps of detecting that a smart card has not been at least partially inserted inside a reader of the terminal; simulating the presence of a smart card inside the reader; measuring a current or voltage value generated by the simulation; comparing the measured current or voltage value with respect to a defined threshold value; detecting the presence of the cloning device if, as a function of said comparison, it results that the measured current or voltage value is greater than or equal to the threshold value; and blocking the operation of the automatic payment and/or withdrawal terminal in case of detecting the presence of the cloning device.

20 Claims, 3 Drawing Sheets

METHOD FOR DETECTING THE PRESENCE OF A SMART CARD CLONING DEVICE IN AN AUTOMATIC PAYMENT AND/OR WITHDRAWAL TERMINAL AND RESPECTIVE AUTOMATIC PAYMENT AND/OR WITHDRAWAL TERMINAL

BACKGROUND

Technical Field

The present disclosure relates to a method for detecting the presence of a smart card cloning device in an automatic payment and/or withdrawal terminal.

Furthermore, the present disclosure relates to an automatic payment and/or withdrawal terminal.

Description of the Related Art

Payment terminals mean all those terminals usable by petrol stations, car parks, kiosks or at the cash desk in supermarkets, tobacconists or restaurants, and also in bars or the like for making a payment with a credit and/or debit card.

Automatic withdrawal terminals (or automated bank teller machines or automated cash dispensers) are all those terminals for the withdrawal of sums of money therefrom.

To date, it is known that devices are exploited for cloning the credit card and/or debit card in order to steal money from the original owner of the card.

The aforementioned devices (or cloning methods) are known as "skimmers" (and the related methods are known as "card skimming").

Such devices are installed by counterfeiters in payment terminals and/or automated bank tellers so that, when payment or withdrawal takes place, they can read and copy the card data through the magnetic bar thereof.

In other words, upon the sliding or insertion of the card in the terminal, such cloning devices intercept communications between cards and terminal readers, copying the necessary information from them for cloning the same.

In particular, such devices are installed in the place of the original readers or superimposed with them so as to be camouflaged in the eyes of those intending to make the payment or withdrawal.

To date there are various methods for detecting such devices which however require the presence of an operator in the field and/or the dismantling of the payment terminal or automated teller machine.

Furthermore, such devices (and the related development and implementation technologies) are continuously evolving hence resulting in devices that are increasingly difficult to trace even once the affected terminal or teller machine has been dismantled.

Disadvantageously, such methods require long processing times which therefore result in an expensive process that can even lead to the failed detection of the cloning device indicated above.

Furthermore, "shimming" technology has recently been developed, which consists of a device that, once installed inside the payment terminal or automated teller machine, intercepts communications between the card chip and the card reader, hence stealing the card data for the cloning thereof.

Said shimming devices are part of cloning devices which, still today, are difficult to detect with conventional methods.

Furthermore, "shimming" technology is not very invasive and therefore difficult to trace, even after the payment terminal has been dismantled.

BRIEF SUMMARY

The technical task of the present disclosure is, therefore, to provide a method for detecting the presence of smart card cloning devices in an automatic payment and/or withdrawal terminal and a respective automatic payment and/or withdrawal terminal that allow to overcome the drawbacks of the prior art.

One embodiment of the present disclosure is, therefore, a method for detecting the presence of smart card cloning devices in an automatic payment and/or withdrawal terminal and the respective automatic payment and/or withdrawal terminal that allow to detect quickly the presence of cloning devices.

A further embodiment of the present disclosure is, therefore, a method for detecting the presence of smart card cloning devices in an automatic payment and/or withdrawal terminal and the respective automatic payment and/or withdrawal terminal that are effective and not expensive in detecting the aforementioned cloning device.

The technical task stated and the specified aims are substantially obtained by a method for detecting the presence of smart card cloning devices in an automatic payment and/or withdrawal terminal and a respective automatic payment and/or withdrawal terminal in accordance with the technical features disclosed in one or more of the appended claims.

In particular, said objects are achieved by a method for detecting the presence of a smart card cloning device in an automatic payment and/or withdrawal terminal, the method comprising the steps of:

detecting that a smart card has not been at least partially inserted inside a reader of said automatic payment or withdrawal terminal;
  simulating the presence of a smart card inside the reader;
  measuring a current or voltage value generated by the simulation;
  comparing the measured current or voltage value with respect to a defined threshold value;
  detecting the presence of the cloning device if, according to the comparison, it results that the measured current or voltage value is greater than or equal to the threshold value;
  in case of detecting the presence of the cloning device, blocking the operation of the automatic payment and/or withdrawal terminal.

BRIEF DESCRIPTION OF THE SEVERAL VIEWS OF THE DRAWINGS

Further characteristics and the related advantages of the present disclosure will become clearer from the indicative, and therefore non-limiting, description of a preferred but not exclusive embodiment of a method for detecting smart card cloning devices in automatic payment terminals and/or automated teller machines.

This description will be provided below with reference to the attached drawings, provided solely for indicative and therefore non-limiting purposes, in which.

DETAILED DESCRIPTION

Figure 1:
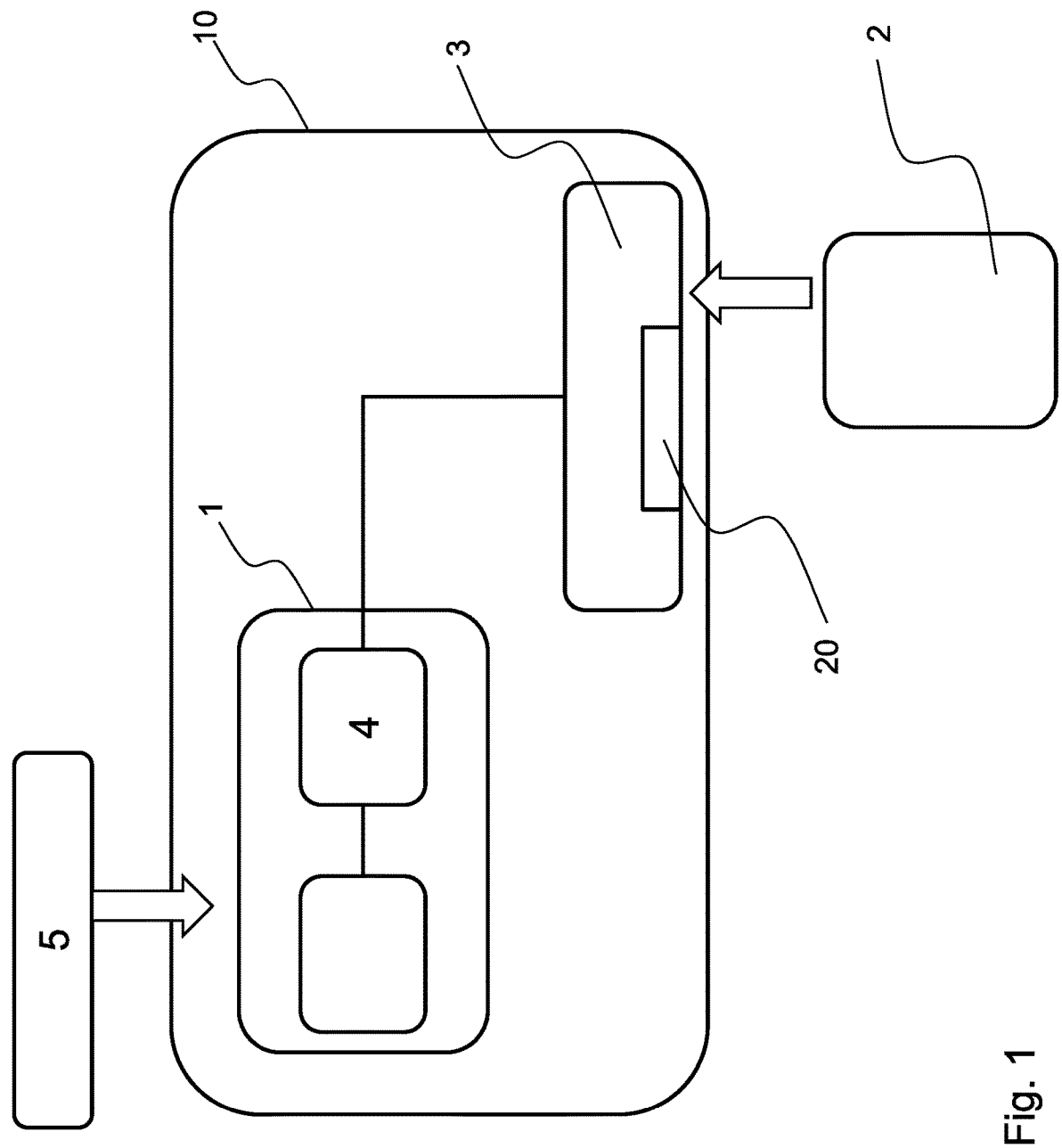
FIG. 1 shows a block diagram of an automatic payment and/or withdrawal terminal according to the application.

With reference to FIG. 1, a block diagram is shown of an automatic payment and/or withdrawal terminal 10 according to the application.

Payment terminals mean all those terminals usable by petrol stations, or at the cash desk in supermarkets, tobacconists or restaurants, and also in bars or the like for making a payment with a credit and/or debit card.

Automatic withdrawal terminals mean all those terminals for the withdrawal of sums of money therefrom, such as automated teller machines or automated cash dispensers.

The term "smart card" means a pocket-sized intelligent card that comprises an integrated circuit and a connection interface towards the outside (typically a set of electrical contacts), in which a data processing unit and a memory are present inside the integrated circuit.

The smart card 2 to which reference is made in the present description may be a credit and/or debit card. The terminal 10 comprises a reader 3 having the function of exchanging data with a smart card 2.

The terminal 10 further comprises a control unit 1 having the function of detecting the presence of a device 20 for cloning the smart card 2, as will be explained in detail below.

The cloning device 20 is a "shimming" device positioned at least partially inside the reader 3 and comprises appropriate electronic circuits able to copy the data of the smart card 2 when the latter is inserted at least partially inside the reader 3, for the purpose of cloning the smart card 2.

The control unit 1 is for example a microprocessor or a microcontroller; alternatively, the control unit is a dedicated electronic circuit.

The control unit 1 is electrically connected on one side to the reader 3 and on the other to a local or remote electronic device 5.

The electronic device 5 is external to the terminal 10 and can be, for example, a smartphone, a tablet or a computer; alternatively, the electronic device 5 is a dedicated device.

The control unit 1 is configured to communicate with the electronic device 5 and with the reader 3, as will be explained in more detail below.

The control unit 1 comprises an analog-to-digital converter 4.

The control unit 1 is configured to detect that the smart card 2 has not been at least partially inserted inside the reader 3.

For example, said detection of the presence of the smart card 2 is performed by means of appropriate warning switches positioned inside the reader 3, in which said switches are closed when the smart card 2 is inserted at least partially inside the reader 3, whereas they are open when the smart card 2 is not inserted in the reader 3.

Furthermore, the control unit 1 is configured to simulate the presence of a smart card inside the reader 3, is configured to measure a current or voltage value generated by the simulation, is configured to compare the measured current or voltage value with a defined threshold value, and is configured to detect the presence of the cloning device 20 inside the reader 3 if, according to said comparison, it ensues that the measured current or voltage value is greater than or equal to the threshold value; finally, the control unit 1 is configured to block the operation of the terminal 10, in case of detecting the presence of the cloning device 20.

Figure 2A:
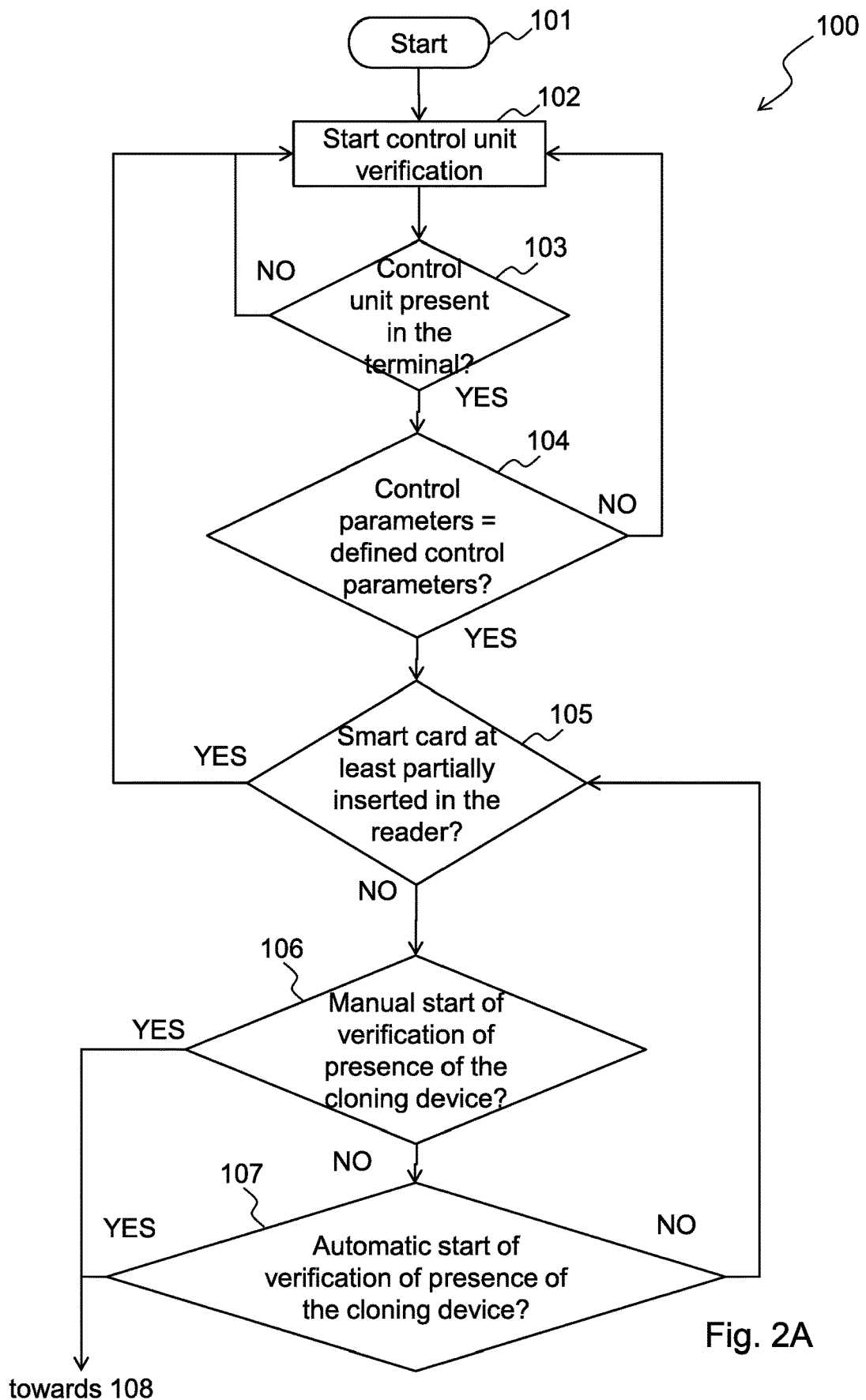
FIGS. 2A-2B show a flow chart of a method for detecting the presence of a smart card cloning device in an automatic payment and/or withdrawal terminal according to the application.
Figure 2B:
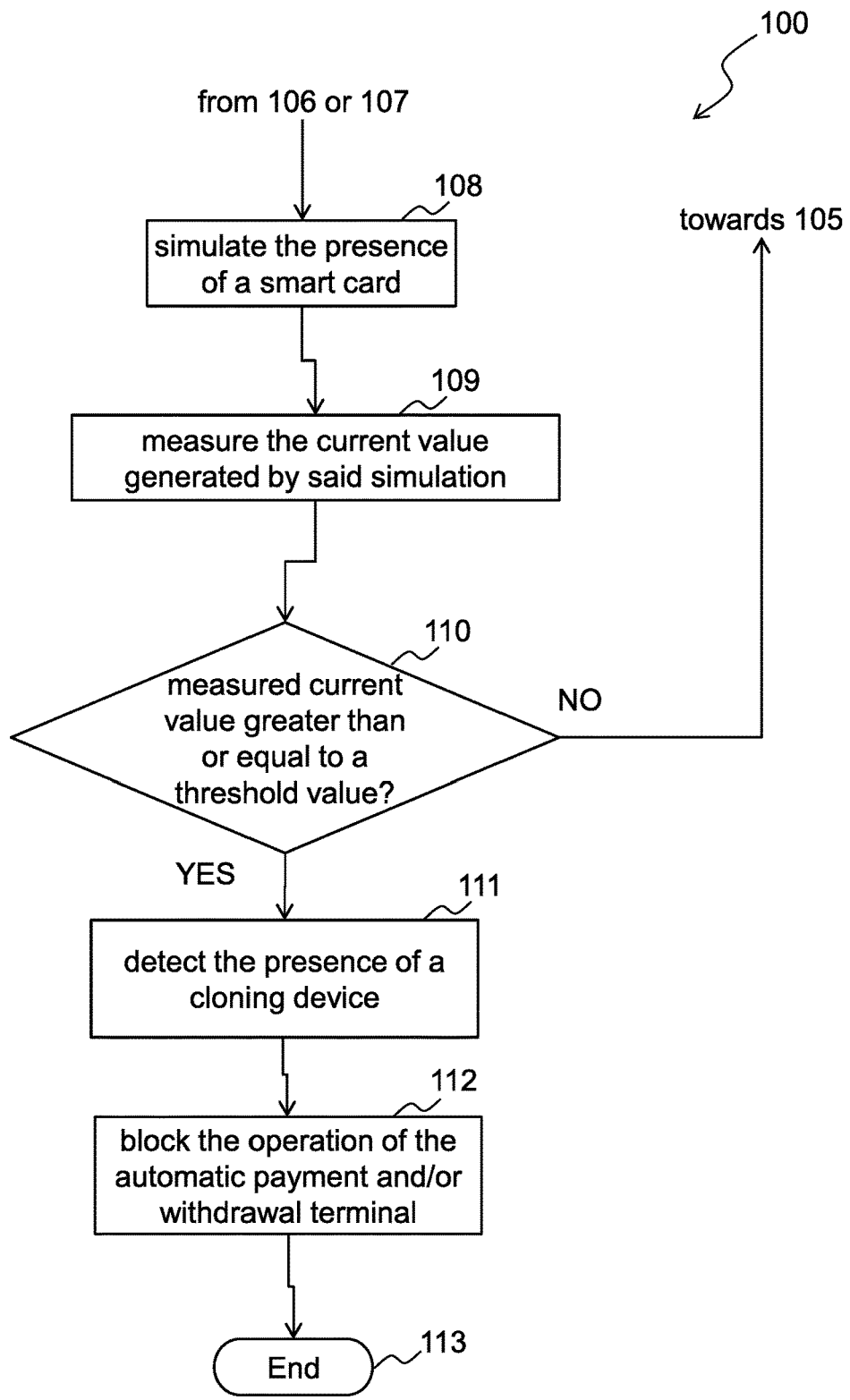

The control unit 1 is therefore configured to perform, by means of an appropriate software code and/or by means of hardware, a method for detecting the presence of a smart card 2 cloning device 20 in the terminal 10, as illustrated in FIGS. 2A-2B.

With reference to FIGS. 2A-2B, the flow chart 100 is described below of the method for detecting the presence of a smart card 2 cloning device 20 in the terminal 10.

The flow chart 100 comprises a step of checking the correct operation of the control unit 1 of the terminal 10 (steps 102, 103, 104) and a step in which the presence of the cloning device 20 is verified (steps 105-112).

The step of checking the correct operation of the control unit 1 is used during the installation of the control unit 1 and at the power-up itself; furthermore, to ensure that the control unit 1 has not been tampered with or has not been damaged due to any failure or malfunctioning correlated with the terminal or with the control unit 1 itself, the verification step is performed periodically.

In particular, the verification step comprises the step 102 of starting the verification process, comprises the step 103 of verifying the effective presence of the control unit 1 in the terminal 10, comprises the step 104 of verifying that the configuration of control parameters of the control unit 1 corresponds to a configuration of defined control parameters and continuing with the other steps of the flow chart that perform the detection of the presence of the cloning device, i.e. with step 105.

Specifically, the step 103 of verifying the presence of the control unit 1 has the function of verifying that the control unit 1 has not been removed from the terminal 10 or, during installation, that it has been assembled correctly.

If the presence of the control unit 1 is not confirmed, the process returns to step 102 and in particular an alarm signal is sent to the electronic device 5.

If the presence of the control unit 1 is confirmed, the process continues to step 104 to verify whether the current configuration of control parameters of the control unit 1 corresponds to a nominal configuration of defined control parameters.

Nominal configuration of defined control parameters means a configuration of the control unit 1 that corresponds to the one set during the installation and configuration step thereof; if for whatsoever reason such step is not verified (e.g. if the control unit 1 is tampered with by anyone who does not want the cloning device 20 to be detected), the control unit 1 is reset so as to return to such configuration of defined control parameters.

Specifically, step 103 comprises verifying that the control unit 1 is not damaged (if tampered with or if damaged for any other reason) and step 104 comprises verifying that the settings of the control unit 1 have not been altered with respect to defined settings necessary for the correct operation of the present detection method.

If either (or both) of the two verifications described above is not verified, the process returns to step 102 and in particular an alarm signal is sent to the electronic device 5.

In one embodiment, the alarm signal is adapted to ensure that the control unit 1 has not been damaged, but also to ensure that the settings are the same as those defined and, in that case, to reprogram them remotely and subsequently perform a reset.

If the steps described above are performed and therefore the control unit 1 is operating correctly, the process continues with the steps of the flow diagram that perform the detection method of the disclosure.

The flow diagram 100 now envisages step 105 of fulfilling determined power-up requirements of the control unit 1. Such requirements consist of verifying that a smart card 2 has not been at least partially inserted in the reader 3 of the terminal 10.

In other words, inside the reader 3 there must be no smart card 2 completely or partially inserted; this condition must be fulfilled in order to perform the method for detecting the presence of the cloning device.

In the event that a smart card 2 is inserted at least partially in the reader 3, step 105 leads to step 102.

If, instead, a smart card 2 has not been inserted at least partially in the reader 3, from step 105 the process continues with a step of starting the verification of the presence of the cloning device; such step can be started manually (step 106) through the electronic device 5 or can be performed automatically by the control unit 1 (step 107) with a determined pre-defined power-up time interval, in the event that the control logic is not performed manually.

In other words, the power-up step can take place by means of a direct command of an operator using the electronic device 5 or automatically with a periodic control of the terminal to ensure that between one control cycle and another, no cloning device 20 has been installed.

The predefined power-up time interval is a value comprised between 1 second and 24 hours, in particular equal to 300 seconds.

The time interval is part of the settings defined of the control unit 1 (and consequently of the configuration of defined control parameters).

The automatic power-up step 107 is interrupted if, during the predefined power-up time interval, the presence is detected of a smart card 2 inserted at least partially (i.e. inserted partially or fully) inside the reader 3 of the automatic payment and/or withdrawal terminal 10.

In other words, step 107 is interrupted if during the time interval the presence is detected of a smart card 2 inserted at least partially in the reader 3; therefore, the detection method returns to the verification step 106 of the presence of the smart card 2 in the reader 3.

In the event that the presence of the smart card 2 in the reader 3 has not been detected and (manually or automatically) the verification has been started of the presence of the cloning device, the step 108 is performed of simulating the presence of a smart card 2 inside the reader 3 of the terminal 10; the step 108 has the aim of deceiving the cloning device 20 which would otherwise not start operating and therefore would not be detectable.

The next steps are step 109 in which a current or voltage measurement generated by the simulation is performed (e.g. through an analog-to-digital converter 4 of the control unit 1) and step 110 in which a comparison is performed between the current or voltage value measured and a defined threshold value.

In case of a current measurement, such defined threshold value is a value comprised between 100 microampere and 1.3 milliampere, preferably a value equal to 130 microampere.

The pre-set threshold value is part of the settings defined by the control unit 1 (and consequently the configuration of the defined control parameters).

If it ensues from the comparison that the measured current or voltage value does not exceed the threshold value, from step 110 the process returns to step 105 to verify the insertion of the smart card 2 in the reader 3.

If, instead, from the comparison it ensues that the measured current or voltage value is greater than or equal to the threshold value (which could be null, or have another value based on the automatic payment or withdrawal terminal to be monitored), from step 110 the process continues to step 111 in which the presence of the cloning device 20 is detected.

In one embodiment, step 110 further comprises notifying the presence of the cloning device 20 through an acoustic signal and/or a visual signal from the terminal 10, by means of a loudspeaker integrated into the terminal 10 and/or by means of a screen included in the terminal 10.

Therefore, in case of detecting the presence of the cloning device 20, the loudspeaker of the terminal 10 will start to emit an acoustic alarm and/or the screen will start to show an alarm message to warn a possible user of the automatic payment or withdrawal terminal 10 that the terminal 10 has been tampered with.

From step 111 the process continues to step 112 in which the automatic payment and/or withdrawal terminal 10 is blocked.

More in particular, the steps 108 to 112 envisage simulating the presence of a smart card inside the reader 3 so as to activate the operation of the cloning device 20 which, by activating itself to read and clone the smart card 2, generates a higher value of a current or voltage by the reader 3 than that which the reader 3 should generate in the event that the smart card 2 is not inserted or the cloning device 20 is not present; at this point, if the presence of the cloning device 20 is detected, the control unit 1 activates a whole series of precautionary measures that conclude with blocking the terminal 10 in which the cloning device 20 was detected.

In case of a measurement of a current value, if a smart card 2 was inserted at least partially inside the reader 3, the current consumed by the reader 3 would be measured, which could make it impossible to distinguish between the presence or absence of the cloning device 20; in fact, different smart cards 2 correspond to different values of measured current consumption and also the different cloning devices 20 have different consumptions once activated.

A reliable current value is the current generated by the reader 3 of the specific terminal 10 that is intended to be monitored when the smart card 2 is not present in the reader 3 and it is in particular the one on which the current threshold is set.

According to a preferred embodiment, the step 108 of simulating the presence of a smart card 2 in the reader 3 comprises exchanging between the control unit 1, the reader 3 and the cloning device 20 the same data and/or electric signals exchanged between the control unit 1, the reader 3 and a smart card 2 when the latter is present in the reader 3 during its power-up, so as to deceive the electronic circuits of the cloning device 20 and detect its presence by means of measuring the current consumption of the reader 3 and/or any other reaction of the cloning device 20.

In particular, said simulation is performed by means of the control unit 1 which, after having detected that no smart card 2 is present in the reader 3, transmits to the reader 3 a power-up message indicative of a power-up request of the smart card 2; alternatively, the control unit 1 is connected to the reader 3 by means of an electric signal and therefore the control unit 1 generates a suitable value of said electric signal indicative of the power-up request of the smart card 2.

The reader 3 receives from the control unit 1 said power-up request (by means of the power-up message or by means of the value of the electric power-up signal) and generates therefrom an electric reset signal indicative of a power-up request of the smart card 2.

In the event that there is a smart card 2 in the reader 3, the smart card 2 receives the reset signal on a reset pin (commonly indicated with "RST" on the smart card 2), therefore the smart card 2 is powered and then the smart card 2 responds to the reader 3 by sending a reset response message.

Otherwise, in case wherein there is no smart card 2 present in the reader 3 and the cloning device 20 is further present inside the reader 3, the cloning device 20 receives the electric power-up signal and therefore the cloning device 20 is powered, therefore it is possible to detect its presence by means of measuring a current consumption of the reader 3 greater than or equal to a threshold value, e.g. equal to 100 microampere.

The reset response message is, for example, the Answer To Reset (ATR) message, as defined in part 3 of standard ISO/IEC 7816, i.e. a message that a smart card 2 communicates to the reader 3 for providing information on the communication parameters proposed by the smart card 2, the nature of the smart card 2 and its status.

The request condition for being able to verify the presence of a cloning device 20 is that of not detecting the presence of a smart card 2: in this way if a non-negligible consumption of current is detected, for example by the reader 3 (without there being a smart card 2 present), it means that a cloning device 20 has been inserted into the reader 3.

It is observed that, for the purpose of the explanation of the disclosure, the measurement of a current value of the terminal 10 has been considered (in particular, the current consumed by the reader 3) for the purpose of detecting the presence of the cloning device 20, but other physical quantities can also be measured correlated with the presence of the cloning device 20 in the reader 3 when the smart card 2 is not inserted in the reader 3, such as voltage values of the reader 3 or failure to receive messages and/or signals at the reader 3 (e.g. failure to receive the Answer To Reset message).

The detection method described above and the terminal 10 allow the drawbacks that have emerged from the prior art to be overcome.

In particular, the method described above allows the presence of a cloning device 20 to be effectively detected.

In particular, the detection method makes it possible not to perform any dismantling operations of the automatic payment and/or withdrawal terminal which could lead to failure to detect the cloning device 20.

In one embodiment, the method described above allows the control unit 1 to be configured based on the specific terminal 10 further allowing any tampering with the control unit 1 using the electronic device 5 to be detected.

One embodiment of the present disclosure is also an automatic payment and/or withdrawal terminal, the terminal comprising a smart card (e.g. debit and/or credit card) reader and a control unit.

In this case, the control unit is configured to detect that a smart card has not been at least partially inserted inside the reader, is configured to activate the supply of power voltage to the reader, is configured to measure a current or voltage value generated at the outlet from said reader, is configured to compare the current or voltage value measured with a sufficiently small defined threshold value (e.g. less than 1.3 milliampere in case of current measurement), is configured to detect the presence of the cloning device if, according to said comparison, it ensues that the measured current or voltage value is greater than or equal to the threshold value, and is configured to block the operation of the automatic payment and/or withdrawal terminal in case of detecting the presence of the cloning device.

The invention claimed is:

1. A method for detecting a presence of a device for cloning a smart card in at least one of an automatic payment terminal and a withdrawal terminal, the method comprising the steps of:
   a) detecting that a smart card has not been at least partially inserted inside a reader of the automatic payment terminal or the withdrawal terminal;
   b) simulating a presence of a smart card inside the reader;
   c) measuring a current or voltage value generated by said simulation;
   d) comparing the measured current or voltage value with respect to a defined threshold value;
   e) detecting the presence of the cloning device when, according to said comparison, the measured current or voltage value is greater than or equal to the threshold value;
   f) in case of detecting the presence of the cloning device, blocking operation of the at least one of the automatic payment terminal and the withdrawal terminal.

2. The detection method according to claim 1, wherein step b) comprises:
   transmitting from a control unit to the reader a power-up message or an electric signal indicative of a power-up request of a smart card;
   receiving at the reader said power-up request and generating therefrom an electric reset signal indicative of a power-up request of a smart card;
   receiving the power-up electric signal at the cloning device and supplying the cloning device, so as to generate said current value,
   wherein said measured current value is the value of current generated by the reader and correlated with said power-up request.

3. The detection method according to claim 1, wherein step e) further comprises signalling the presence of the cloning device through at least one of an acoustic and a visual warning generated by the at least one of the automatic payment terminal and the withdrawal terminal.

4. The detection method according to claim 1, wherein step d) comprises comparing the measured current value with respect to a threshold value comprised between 100 microampere and 1.3 milliampere.

5. The detection method according to claim 1, further comprising automatically executing, with a period equal to a defined time interval, the step b) of simulating the presence of a smart card inside the reader.

6. The detection method according to claim 5, wherein the defined time interval is comprised between 2 seconds and 24 hours.

7. The detection method according to claim 5, wherein the automatic execution step is interrupted if, during said defined power-up interval, the presence of a smart card at least partially inserted inside the reader is detected and returns to the step a) of detecting whether the smart card is inserted at least partially inside the reader.

8. The detection method according to claim 1, further comprising, before step a), the steps of:
   verifying whether a current configuration of control parameters corresponds to a configuration of defined control parameters;
   in case of a positive verification, proceeding with step a) of said detection method.

9. A terminal comprising at least one of an automatic payment terminal and a withdrawal terminal, the terminal comprising:
a smart card reader;
a control unit configured to:
detect that a smart card has not been at least partially inserted inside the reader;
simulate a presence of a smart card inside the reader;
measure a current or voltage value generated by said simulation;
compare the measured current or voltage value with respect to a defined threshold value;
detect a presence of a cloning device when, according to said comparison, the measured current or voltage value is greater than or equal to the threshold value;
in case of detecting the presence of the cloning device, block the operation of at least one of the automatic payment terminal and the withdrawal terminal.

10. The terminal according to claim 9, wherein:
the control unit is configured to transmit to the reader a smart card power-up message or an electric signal indicative of a power-up request of a smart card;
the reader is configured to receive the power-up request and generate therefrom an electric reset signal indicative of a power-up request of the smart card;
the terminal further comprising a cloning device configured to receive the electric power-up signal and activate its power supply, so as to generate said current value, wherein said measured current value is the current value generated by the reader and correlated with said power-up request.

11. The terminal according to claim 9, further comprising a loudspeaker configured to emit an acoustic signal, in case of detecting the presence of the cloning device.

12. The terminal according to claim 9, further comprising a screen configured to generate at least one of a text indication and a graphic indication representative of the presence of the cloning device.

13. The terminal according to claim 9, wherein the threshold value is comprised between 100 microampere and 1.3 milliampere.

14. The terminal according to claim 9, wherein the control unit is configured to automatically perform said detection, simulation, measurement and comparison based on a period equal to a defined time interval.

15. The terminal according to claim 9, wherein the control unit is further configured to verify that a current configuration of control parameters corresponds to a configuration of defined control parameters.

16. The detection method according to claim 4, wherein the threshold value is equal to 130 microampere.

17. The detection method according to claim 2, wherein step d) comprises comparing the measured current value with respect to a threshold value comprised between 100 microampere and 1.3 milliampere.

18. The detection method according to claim 6, wherein the automatic execution step is interrupted if, during said defined power-up interval, it is detected the presence of a smart card at least partially inserted inside the reader and it returns to the step a) of detecting whether the smart card is inserted at least partially inside the reader.

19. The terminal according to claim 13, wherein the threshold value is equal to 130 microampere.

20. The terminal according to claim 10, wherein the threshold value is comprised between 100 microampere and 1.3 milliampere.

* * * * *